US006549676B1

(12) United States Patent
Nakayama et al.

(10) Patent No.: US 6,549,676 B1
(45) Date of Patent: Apr. 15, 2003

(54) ENCODING DEVICE

(75) Inventors: Tadayoshi Nakayama, Tokyo (JP); Hiroshi Kajiwara, Inagi (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/412,432

(22) Filed: Oct. 5, 1999

(30) Foreign Application Priority Data

Oct. 6, 1998 (JP) .......................................... 10-284119

(51) Int. Cl.[7] ................................................. G06K 9/36
(52) U.S. Cl. ........................ 382/246; 382/238; 382/239
(58) Field of Search ............................... 382/232–233, 382/238, 251, 239, 240, 244–246, 248, 250; 358/476, 539; 341/65, 67, 50, 107; 375/240.03, 240.11, 240.12, 240.19, 240.23, 240.25, 240.24, 240.18, 240.2

(56) References Cited

U.S. PATENT DOCUMENTS

| | | | |
|---|---|---|---|
| 5,581,373 A | 12/1996 | Yoshida ....................... 358/476 |
| 5,751,860 A | * 5/1998 | Su ............................... 382/244 |
| 5,764,374 A | * 6/1998 | Seroussi et al. ............. 382/244 |
| 5,801,650 A | 9/1998 | Nakayama .................... 341/67 |
| 5,818,970 A | 10/1998 | Ishikawa et al. ............ 382/248 |
| 5,841,381 A | 11/1998 | Nakayama .................... 341/67 |
| 5,945,930 A | 8/1999 | Kajiwara ...................... 341/50 |
| 5,960,116 A | 9/1999 | Kajiwara ..................... 382/238 |
| 5,986,594 A | 11/1999 | Nakayama et al. ......... 341/107 |
| 6,028,963 A | 2/2000 | Kajiwara ..................... 382/239 |

OTHER PUBLICATIONS

R. Ohnishi et al., "Efficient Coding For Binary Information Sources", The Journal Of The Institute Of Electronics, Information And Communication Engineers, 77/12 vol. J60–A, No. 12. (with partial translation).

* cited by examiner

*Primary Examiner*—Phuoc Tran
*Assistant Examiner*—Ishrat Sherali
(74) *Attorney, Agent, or Firm*—Fitzpatrick, Cella, Harper & Scinto

(57) ABSTRACT

The objective of the present invention is to perform fast variable-length coding that is applied for lossless compression and encoding. To achieve this objective, an encoding device comprises a unit for determining, from a plurality of states, states of peripheral pixels of an object pixel to be encoded, a unit for producing a predicted value of the object pixel based on the peripheral pixels, a memory used for storing a k parameter ($k \leq 0$) for each of the plurality of states, a unit for encoding a prediction difference between the value of the object pixel and a predicted value to variable-length code having a code length that is obtained by using the prediction difference and the k parameter that is stored in the memory and corresponds to the state determined by the state determination unit and a unit for, after variable-length encoding is performed for the object pixel, updating in advance the k parameter in order to perform variable-length encoding for another pixel that has the same state as the state determined by the state determination unit, and for writing the k parameter to the memory.

14 Claims, 11 Drawing Sheets

| DIFFERENCE VALUE | QUANTIZATION VALUE |
|---|---|
| Th3 — 255 | 4 |
| Th2 — Th3-1 | 3 |
| Th1 — Th2-1 | 2 |
| 1 — Th1-1 | 1 |
| 0 | 0 |
| -Th1+1 — -1 | -1 |
| -Th2+1 — -Th1 | -2 |
| -Th3+1 — -Th2 | -3 |
| -255 — -Th3 | -4 |

FIG. 9

| INTEGER VALUE V / k PARAMETER | 0 | 1 | 2 | 3 | 4 | ... |
|---|---|---|---|---|---|---|
| 0 | 1 | 01 | 001 | 0001 | 00001 | ... |
| 1 | 01 | 11 | 001 | 101 | 0001 | ... |
| 2 | 001 | 011 | 101 | 111 | 0001 | ... |

EXAMPLE OF GOLOMB-RICE ENCODING

FIG. 11

| INDEX | RLT |
|---|---|
| 0—3 | 0 |
| 4—7 | 1 |
| 8—11 | 2 |
| 12—15 | 3 |
| 16, 17 | 4 |
| 18, 19 | 5 |
| 20, 21 | 6 |
| 22, 23 | 7 |
| 24 | 8 |
| 25 | 9 |
| 26 | 10 |
| 27 | 11 |
| 28 | 12 |
| 29 | 13 |
| 30 | 14 |
| 31 | 15 |

ENCODING DEVICE

BACKGROUND OF THE INVENTION

1. Field of the Invention

The present invention relates to an encoding device for encoding image data.

2. Related Background Art

Recently, there has been an increase in the number of applications for compressing static images as image data and for externally transmitting the compressed image data, or for storing it in a memory. For these purposes, it is preferable that lossless compression and encoding be used, especially when the data is for static images used for medical purposes, so that no deterioration of image quality occurs.

Accordingly, various efficient lossless compression and encoding methods have been proposed. For example, a compression and encoding method has been proposed for outputting a difference between a pixel to be encoded and a predicted value generated by using peripheral pixels, and for performing Golomb-Rice coding for this difference.

However, a specific device configuration for performing these proposed compression and encoding methods is not yet established.

SUMMARY OF THE INVENTION

To resolve this problem, it is one objective of the present invention to perform efficient lossless compression and encoding, and in particular to provide an arrangement for performing fast Golomb-Rice encoding that is applied for the lossless compression and encoding method.

To achieve the above objective, according to the present invention, an encoding device, which sequentially encodes a plurality of pixels, comprises:

state determination means (corresponding to state discrimination circuit 110 in the preferred embodiments) for determining, from a plurality of states, states of peripheral pixels (corresponding to state S in FIG. 4) of an object pixel to be encoded (corresponding to x);

predicted value generation means (corresponding to prediction unit 401 or an error feedback circuit 402) for producing a predicted value (corresponding to P or P') of the object pixel based on the peripheral pixels (corresponding to a, b and c);

a memory (corresponding to a memory 404) used for storing a k parameter ($k \geq 0$) for each of the plurality of states;

variable-length coding means (corresponding to a Golomb-Rice encoding circuit 104) for encoding a prediction difference between the value of the object pixel and a predicted value to variable-length code having a code length that is obtained by using the prediction difference and the k parameter that is stored in the memory and corresponds to the state determined by the state determination means; and k parameter updating means (corresponding to a k parameter generation circuit 406) for, after variable-length encoding is performed for the object pixel, updating in advance the k parameter in order to perform variable-length encoding for another pixel that has the same state as the state determined by the state determination means, and for writing the k parameter to the memory.

Further, to achieve the objective, an encoding device, which sequentially encodes a plurality of pixels, comprises:

state determination means for determining, from a plurality of states, a state of an object pixel to be encoded;

predicted value generation means for producing a predicted value of the object pixel;

a memory used for storing a k parameter ($k \geq 0$) for each of the plurality of states;

variable-length coding means for encoding a prediction difference between the value of the object pixel and the predicted value to variable-length code having a code length that is obtained by using the prediction difference and the k parameter that is stored in the memory and corresponds to the state determined by the state determination means; and k parameter updating means for, after variable-length encoding is performed for the object pixel, updating in advance the k parameter in order to perform variable-length encoding for another pixel that has the same state as the state determined by the state determination means, and for writing the k parameter to the memory.

In addition, to achieve the above objective, an encoding device, which sequentially encodes a plurality of pixels, comprises:

state determination means for determining, from a plurality of states, a state of object data to be encoded;

a memory used for storing a k parameter ($k \geq 0$) for each of the plurality of states;

variable-length coding means for encoding the object data to variable-length code having a code length that is obtained by using the object data and the k parameter that is stored in the memory and corresponds to the state determined by the state determination means; and k parameter updating means for, after variable-length encoding is performed for the object data, updating in advance the k parameter in order to perform variable-length encoding for different data that has the same state as the state determined by the state determination means, and for writing the k parameter to the memory.

Other objects and features of the present invention will become apparent during the course of the explanation for the following embodiments, given while referring to the accompanying drawings.

BRIEF DESCRIPTION OF THE DRAWINGS

FIG. 2 is a diagram showing the positional relationship between a pixel to be encoded and peripheral pixels;

FIG. 3 is a diagram showing a method for quantizing a difference among peripheral pixels;

FIG. 9 is a diagram showing example Golomb-Rice code using k parameters of 0, 1 and 2;

FIG. 11 is a diagram showing RLT values relative to index values in run-length coding;

DETAILED DESCRIPTION OF THE PREFERRED EMBODIMENTS

The preferred embodiments of the present invention will now be described.

First Embodiment

A detailed explanation will now be described while referring to a first embodiment of the present invention.

Figure 1:
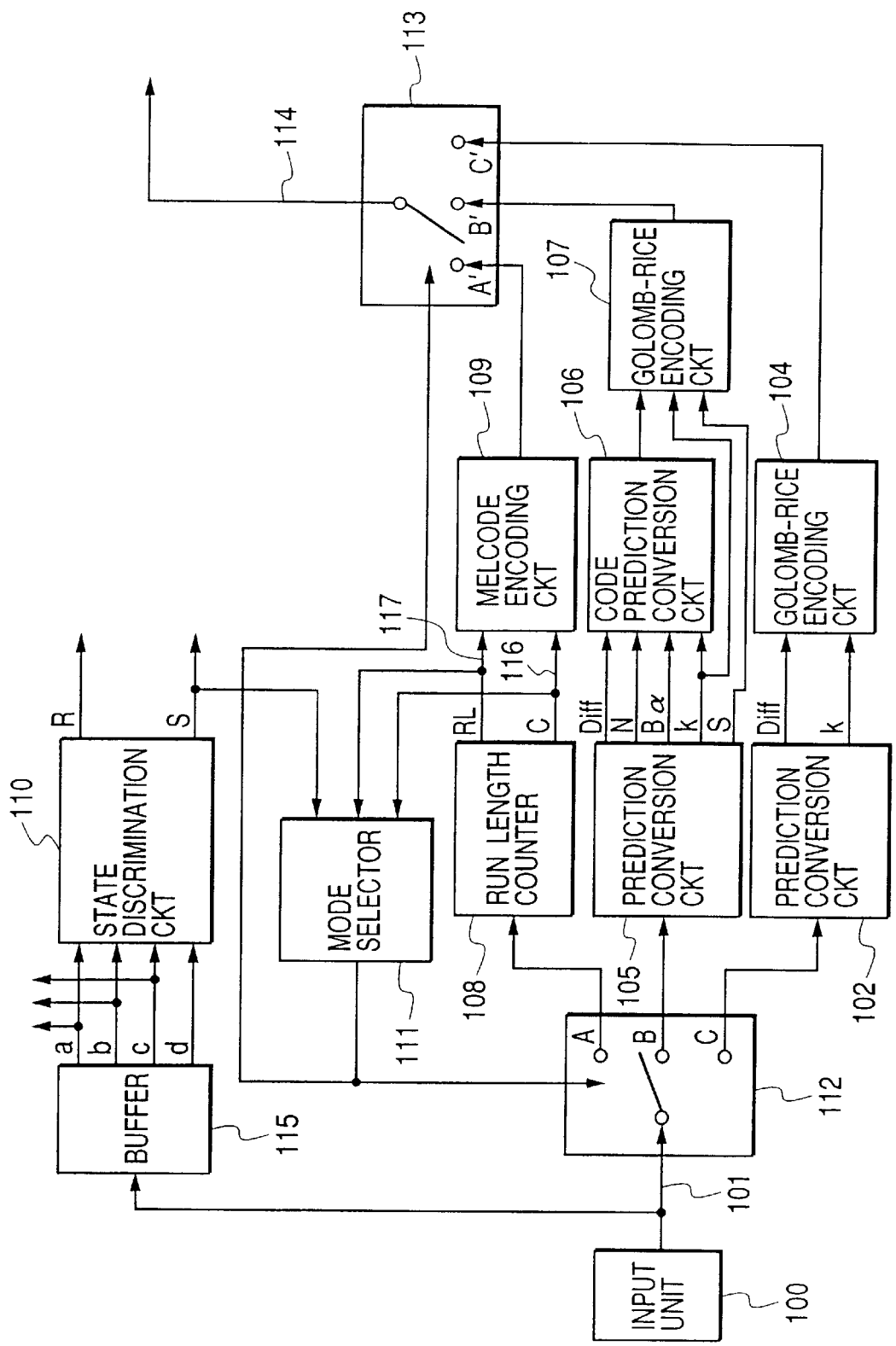
FIG. 1 is a block diagram for a first embodiment of the present invention.

FIG. 1 is a block diagram for carrying out the first embodiment of the present invention. An input unit 100 in FIG. 1 is a device provided for receiving image data.

Also provided are signal lines 101 and 114, along which image data are transmitted to succeeding stages; prediction conversion circuits 102 and 105; Golomb-Rice coding circuits 104 and 107; a sign prediction conversion circuit 106; a run-length counter 108; a Melcode encoding circuit 109; a state discrimination circuit 110; a mode selector 111; switches 112 and 113; and a buffer for storing image data for two lines.

In this embodiment, encoding is performed by changing three coding modes. Specifically, the first mode is a normal mode wherein the prediction conversion circuit 102 and the Golomb-Rice coding circuit 104 perform an encoding process; the second mode is a run-length mode wherein the run-length counter 108 and the Melcode encoding circuit 109 perform an encoding process; and the third mode is a run end mode wherein the prediction conversion circuit 105, the sign prediction conversion circuit 106 and the Golomb-Rice encoding circuit 107 perform an encoding process.

The operations of the individual sections in this embodiment will now be described by employing an encoding example for a monochrome image signal when eight bits are used for one pixel (a value of 0 to 255). It should be noted, however, that the present invention is not limited to this example, and can also be applied for the encoding performed for a multi-valued color image that is composed of RGB color components of 8 bits each, or Lab luminance and chromaticity components of 8 bits each. Each component need only be encoded in the same manner as that used for the monochrome image signal.

The encoding of each component can be changed for each screen, and the decoding side can confirm the condition of the overall image at an early stage. The encoding of each component can be changed for each pixel, each line or each band formed using a plurality of lines, and early monitoring of a partially completed color image is possible.

All the internal values of the buffer 115 are initially set to 0.

A pixel to be encoded (hereinafter referred to as an object pixel) is input by the input unit 100 in the order used for raster scanning, and is transmitted along the signal line 101 to the switch 112 and to the buffer 115.

The image data are sequentially transmitted to the buffer 115 and are held for two lines. These two lines consist of a line in which the object pixel is present and the preceding line that was input.

The state discrimination circuit 110 generates a status number S, which represents the status of peripheral pixels of the object pixel, and a phase flag R, which is used to identify the phases of the pixels. First, the state discrimination circuit 110 reads, from the buffer 115, image data that correspond to peripheral pixels a, b, c and d of the object pixel.

FIG. 2 is a diagram showing the positional relationship of the object pixel and its peripheral pixels a, b, c and d. In FIG. 2, the peripheral pixels a, b, c and d are those relative to the object pixel that have already been encoded. The pairs d-b, b-c and c-a are obtained by using the image data a, b, c and d that have been read. In accordance with the data correlation steps shown in FIG. 3, these values are quantized to provide values at nine levels, −4, −3, −2, −1, 0, 1, 2, 3 and 4, and to obtain quantized values q(d-b), q(b-c) and q(c-a).

The status number S, which represents the status of a peripheral pixel, is generated using the calculation formula q(d-b)×81+q(b-c)×9+q(c-a). Then, the sign of the status number S is examined to determine whether it is positive or negative. When the sign is positive, the phase flag R is set to 0, and when the sign is negative, the phase flag R is set to 1 and the value of the status number S is converted to a positive value. Through this processing, status numbers, of from 0 to 365, and the phase flag R, which indicates a value of 0 or 1, are generated and output.

The mode selector 111 selects an encoding mode and changes the switches 112 and 113 by using the status number S, obtained by using the state discrimination circuit 110 and a run length RL and an encoding control signal Q that are generated by the run-length counter 108. The initial value of the run-length RL of the run-length counter 108 is 0.

Figure 8:
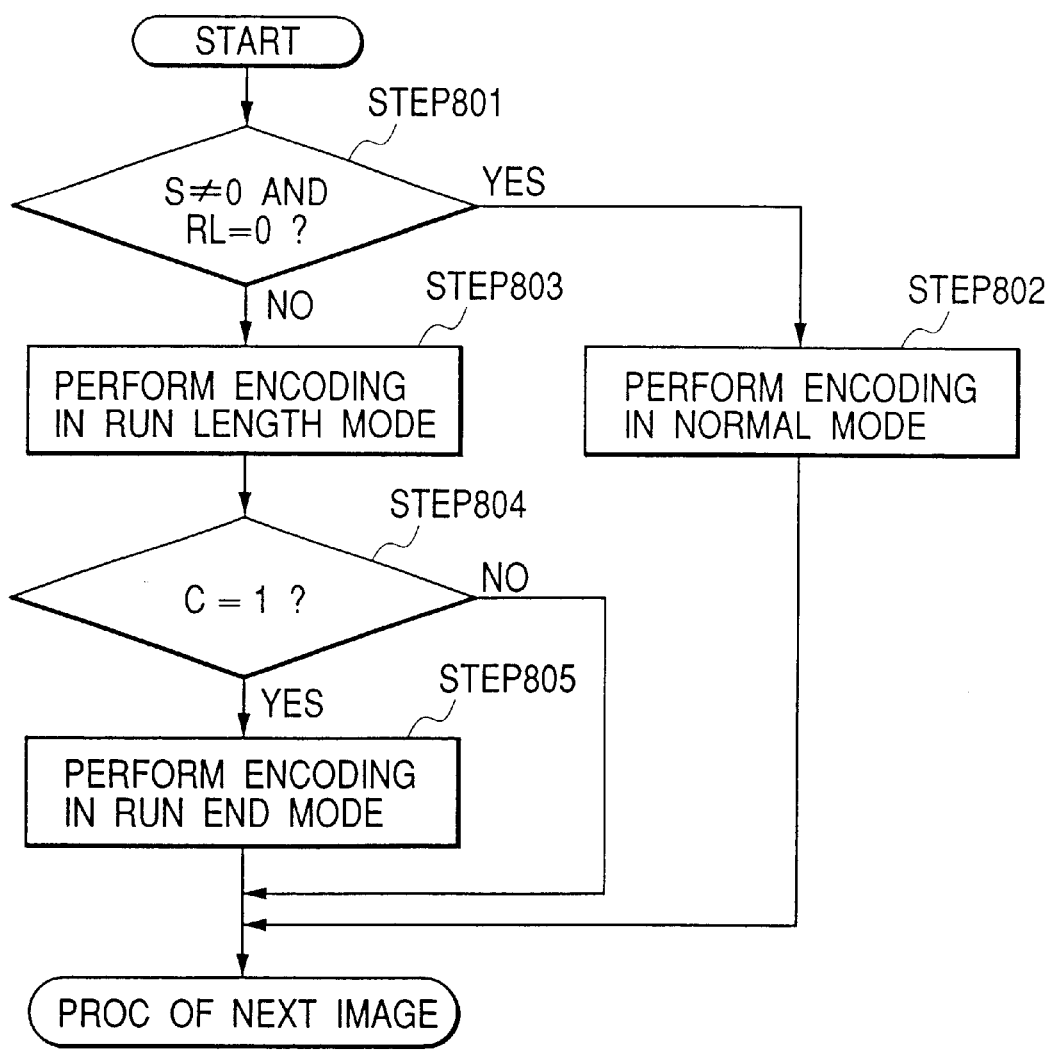
FIG. 8 is a flow chart showing the control provided for a coding mode by a mode selector.

FIG. 8 is a flow chart showing the overall code mode control process performed by the mode selector 111 for one of the pixels that is to be encoded. The detailed processing performed for each step will be described later.

First, at STEP 801, the mode selector 111 receives the status number S and the run-length RL for an object pixel to be encoded. When S≠0 and RL=0, program control moves to STEP 802. For the other cases, program control goes to STEP 803.

At STEP 802, the switch 112 is connected to terminal C and the switch 113 is connected to terminal C' to perform encoding in the normal mode. At STEP 803, the switch 112 is connected to terminal A and the switch 113 is connected to terminal A' to perform encoding in the run-length mode, i.e., to encode the run-length. During the encoding processing in the run-length mode, which will be described in detail later, each pixel not actually encoded and output, but when the run-length has been established, i.e., when the end of the string of like sequential pixel values is reached, these pixels are encoded and output. In this case, the value of the encoding control signal c is changed from 0 to 1.

Following STEP 803, the value of the encoding control signal c is examined at STEP 804. When c=1, program control advances to STEP 805. At STEP 805, the switch 112 is connected to terminal B and the switch 113 is connected to terminal B' to perform encoding in the run end mode. The above described processing is repeated for each pixel, and one of the three encoding modes is selected for encoding.

The reason for changing the three encoding modes, i.e., the roles of the three encoding modes, will be briefly explained.

The normal mode is applied for encoding a pixel for which it is predicted that a prediction difference obtained by predictive conversion will indicate a Laplace distribution. It should be noted that when it is expected that a run at the same luminance will be continued (peripheral pixels have the same luminance level), the normal mode is changed to the run-length mode to further increase the coding efficiency.

The run-length mode is employed when it is expected that a run having the same luminance level will be continued, and instead of a prediction difference, the run-length of the pixel value is encoded (run-length coding). Therefore, while in the normal mode (in which Huffman coding or Golomb-Rice coding is employed for a prediction difference) one sample of one bit or smaller can not be encoded, in the run-length mode one sample of one bit or smaller can be encoded, and coding efficiency can be improved.

The run terminal mode is a mode for encoding an object pixel when the run at the same luminance level is terminated. Since the value of a pixel to be encoded is the final terminal of the run-length for run-length coding, it differs from the preceding pixel value. Therefore, when the preceding pixel value is regarded as a predicted value, as in the normal mode, the condition is so special that a prediction difference of 0 does not occur and the encoding efficiency is not improved.

While taking this situation into account, rather than the normal mode, the run terminal mode is employed to encode the pixel for which the run-length mode has been completed, i.e., the object pixel whose value relative to the value of the preceding pixel has been changed. Further, when predictive encoding is to be performed for the object pixel in the above condition, the distribution of the prediction differences tends to be discrete, and is predicted to be far from being the Laplace distribution. In this condition, since the predicted value correction that will be described later for use in the normal mode is not very effective, encoding is performed without using the prediction difference. It should be noted that it is highly probable that the coding efficiency will be preferable for the next pixel to be encoded when its preceding pixel value is employed as a predicted value.

The individual three encoding modes will now be explained.

First, an explanation will be given for the encoding process in the normal mode performed by the prediction conversion circuit 102 and the Golomb-Rice encoding circuit 104.

The prediction conversion circuit 102 predicts the value of an object pixel by using those for peripheral pixels a, b and c of the object pixel, and generates a difference (prediction difference) Diff between a predicted value obtained by the prediction and the actual value of the object pixel, and a k parameter that will be described later.

Figure 4:
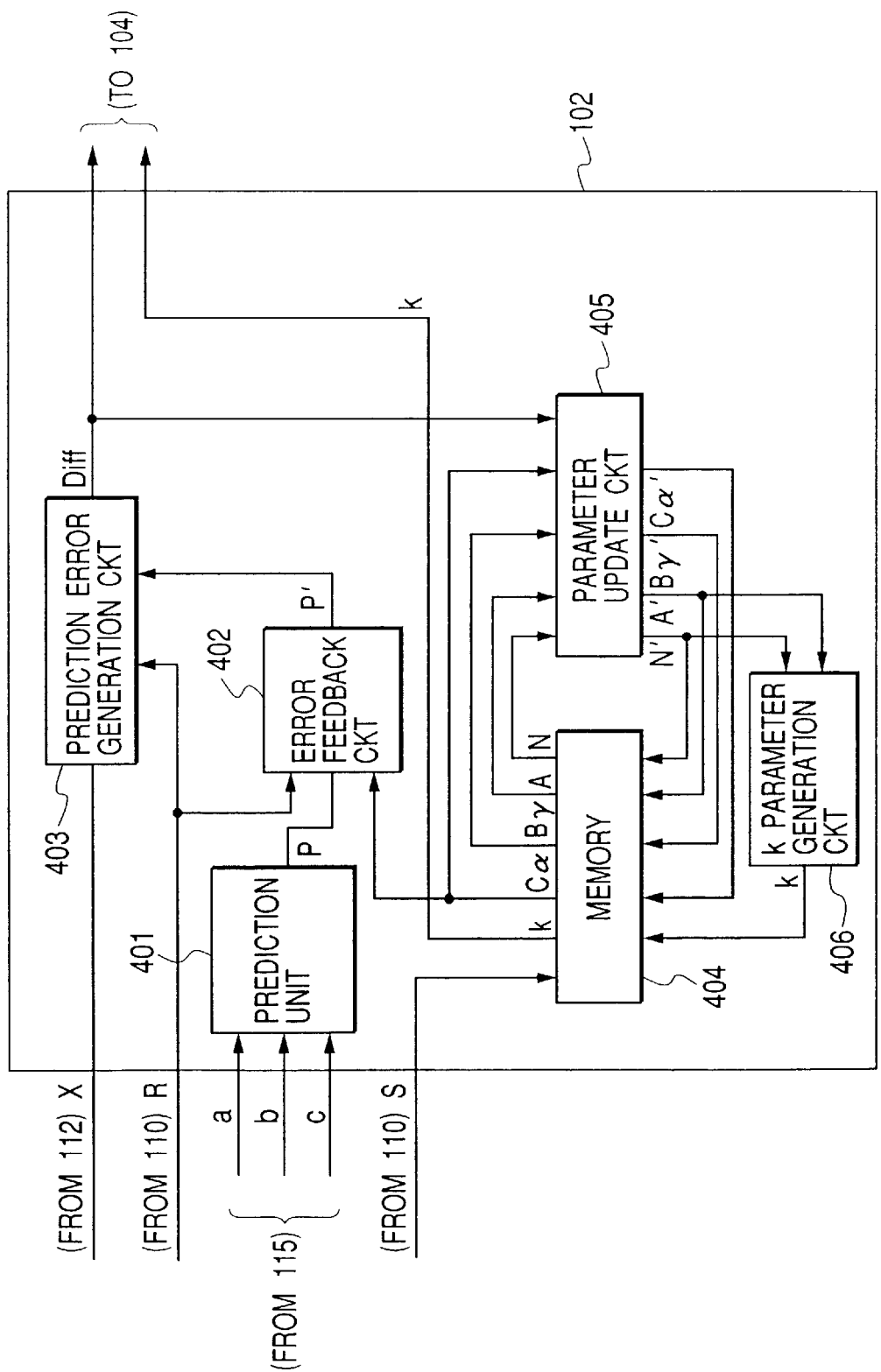
FIG. 4 is a diagram illustrating the arrangement of a prediction converting circuit.

FIG. 4 is a diagram showing the internal arrangement of the prediction conversion circuit 102.

In FIG. 4, the prediction conversion circuit 102 comprises: a prediction unit 401, an error feedback circuit 402, a prediction error generation circuit 403, a memory 404, a parameter update circuit 405, and a k parameter generation circuit 406.

Although not shown in FIG. 1, the prediction conversion circuit 102 receives pixel value data for the peripheral pixels a, b and c from the buffer 115, and the status number S and the phase flag R from the state discrimination circuit 110. Further, the pixel value x of the object pixel is received from the terminal C of the switch 112.

Four parameters, N, A, Bγ and Cα, are stored in the memory 404 for the individual status numbers S. These values are initialized at the beginning of encoding as: N=1, A=4 and Bγ=Cα=0.

In the present invention, the k parameter that is to be used for Golomb-Rice encoding for the object pixel is also stored in the memory 404, while it is updated as needed.

Specifically, immediately after the object pixel is encoded, the k parameter is prepared by using the parameters A' and N' currently obtained by updating the parameters A and N, and is stored in advance in the memory 404. That is, the preparation of the k parameter and its storage in the memory 404 are performed in advance, regardless of the timing whereat the Golomb-Rice encoding is begun for a pixel succeeding the object pixel by using the k parameter. Therefore, the preparation of the k parameter need not be started when the Golomb-Rice encoding is begun for a pixel succeeding the object pixel. Therefore, the fast Golomb-Rice encoding can be performed. The k parameter is initialized to "2" when the encoding is started.

The parameter N is the number of times to generate the status S, the parameter A is the sum of the absolute values of the prediction errors in the status S, the parameter Bγ is the sum of the prediction errors in the status S, and Cα is a correction value used to correct the predicted value.

The processing performed by the prediction conversion circuit 102 will now be described while referring to FIG. 4. First, the prediction unit 401 obtains, from the buffer 115, pixel values of the peripheral pixels a, b and c (see FIG. 2 for the positional relationship) of the object pixel to be encoded. A predicted value P is generated based on the pixel values a, b and c. The predicted value P is obtained by the following equation.

$$P = \begin{vmatrix} \max(a, b); \text{ when } \min(a, b) > c \\ \min(a, b); \text{ when } \max(a, b) > c \\ a + b - c; \text{ for a case other than the above cases} \end{vmatrix}$$

The error feedback circuit 402 corrects the predicted value P by using a prediction correction value Cα in the status S that is transmitted to the memory 404, which will be described later, and generates a corrected predicted value P'. Specifically, when the phase flag R received from the status discriminating circuit 110 indicates 0, P'=P+Cα, while when the phase flag R indicates 1, P'=P−Cα. Further, when P' is smaller than 0, P'=0, and when P' is equal to or greater than 255, P'=255.

The prediction error generation circuit 403 calculates a difference between the pixel value x of the object pixel and the corrected predicted value P', and generates a prediction difference Diff. When the phase flag R indicates 0, Diff=x−P', while when the phase flag R indicates 1, Diff=P'−x.

The prediction error generation circuit 403 adds 255 to the difference Diff when Diff is smaller than −128, or subtracts 255 from the difference Diff when Diff is equal to or greater than 128, so that the value of the difference Diff can be represented within the range of −128 to 127.

In synchronization with the Golomb-Rice encoding for the object pixel, the parameter update circuit 405 reads, from the memory 404, the four parameters N, A, Bγ and Cα in the status S, and updates them to N', A', Bγ' and Cα'. Specifically, A'=A+|Diff| and Bγ'=Bγ+Diff are calculated to obtain A' and Bγ'. When the value N is equal to threshold value Th1, the values of N, A and Bγ are multiplied by ½. The threshold value Th1 is used to limit the parameters N, A and Bγ within a specific range, and is designated in advance (e.g., Th1=64). Then, N is updated by calculating N'=N+1.

Figure 12:
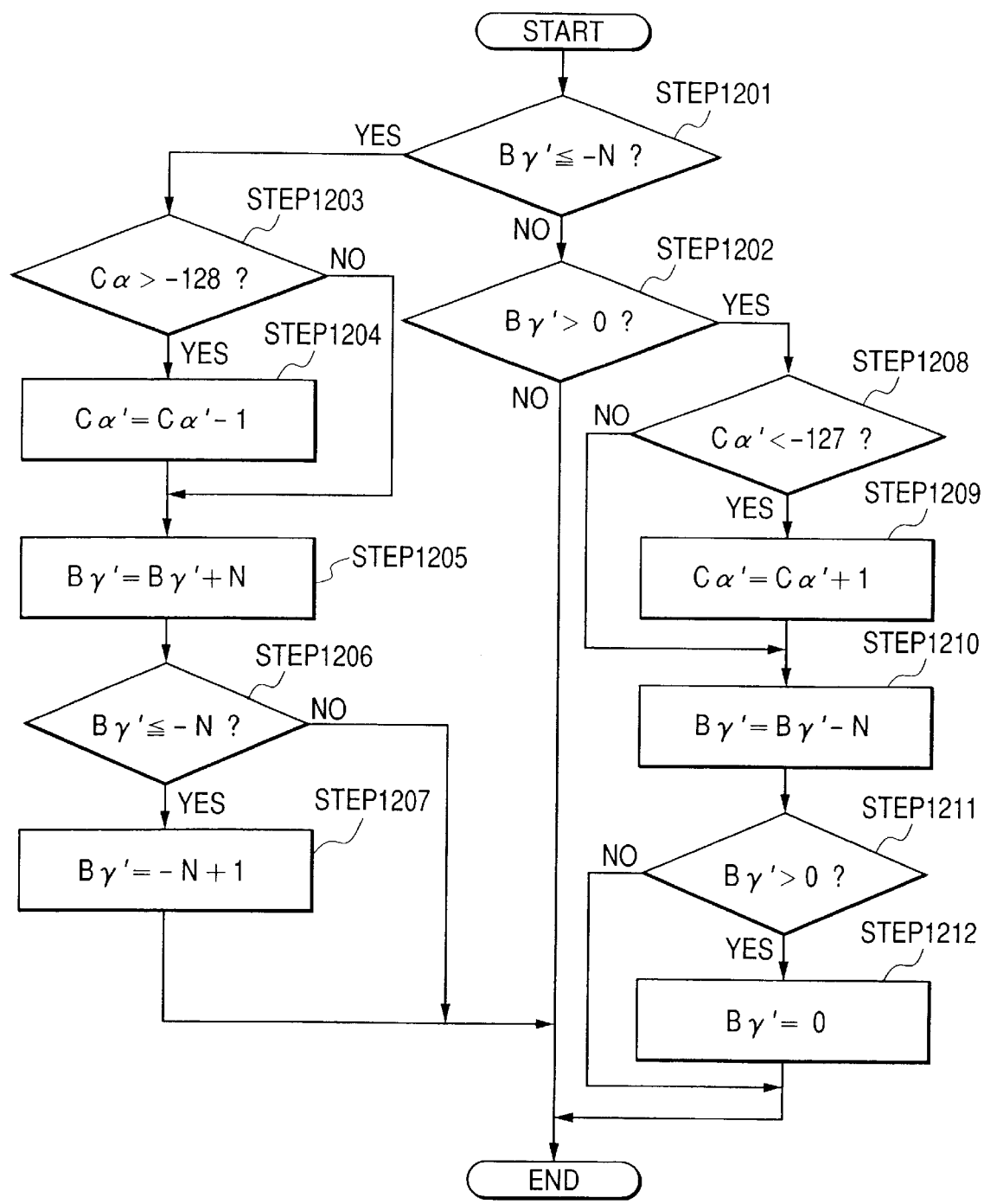
FIG. 12 is a flow chart showing the processing for updating prediction correction value C.

FIG. 12 is a flow chart showing the processing for updating the prediction correction value Cα. When the value of Cα is substituted into Cα', at STEP 1201 a check is performed to determine whether the parameter Bγ' is equal to or smaller than −N. When the value Bγ' is equal to or smaller than −N, program control advances to STEP 1203. If the value Bγ' is greater than −N, program control moves to STEP 1202.

At STEP 1203, the value of Cα' is compared with −128. When the value Cα' is greater than −128, Cα' is decremented by 1 (STEP 1204).

Then, the value N is added to Bγ' (STEP 1205). When the value Bγ' is equal to or smaller than −N, Bγ' is set as Bγ'=−N+1 (STEP 1206 and STEP 1207).

At STEP 1202, Bγ' is compared with 0. When Bγ is equal to or greater than 0, program control goes to STEP 1208. When Bγ' is smaller than 0, the updating processing is terminated.

At STEP 1208, Cα' is compared with 127. When Cα' is smaller than 127, Cα' is incremented by 1 (STEP 1209). Then, N is subtracted from Bγ' (STEP 1210). When Bγ' is equal to or greater than 0, Bγ' is set as Bγ'=0 (STEP 1211 and STEP 1212).

The finally obtained parameters N', A', Bγ' and Cα' are output to the memory 404, and the four parameters N, A, Bγ and Cα in the status S, which are stored in the memory 404, are replaced with the new ones. At the same time, the parameters N' and A' are output to the k parameter generation circuit 406.

The k parameter generation circuit 406 begins the Golomb-Rice encoding for the object pixel, and at the same time, receives the count N' of generation of the status S, which is updated by the parameter update circuit 405, and the sum A' of the absolute values of the prediction differences in the status S. Also, at this time, the k parameter generation circuit 406 employs min(k|N×2^k ≧ A) to obtain the value of the k parameter that is to be used for Golomb-Rice encoding. Here, min(a|b) is the minimum value of a that satisfies the condition b.

The k parameter that is generated at this time is stored in the memory 404 until the Golomb-Rice encoding for the following object pixel is begun. When the Golomb-Rice encoding is started for the succeeding object pixel, the k parameter is immediately output. According to this method, the Golomb-Rice encoding speed can be improved by the time equivalent to the processing time for generating a k parameter, compared with the speed required for process whereby the parameters N and A are read from the memory 404 each time the Golomb-Rice encoding is started, and whereby a k parameter is generated by using these parameters and are supplied to the Golomb-Rice encoding circuit 104. As a result, the overall encoding speed can be increased.

Through the above processing, the prediction conversion circuit 102 generates the prediction difference Diff and the k parameter, and outputs them to the Golomb-Rice encoding circuit 104 at the succeeding stage.

First, the Golomb-Rice encoding circuit 104 employs the following equation to convert, into a non-negative integer value V, the prediction difference Diff that is output by the predication conversion circuit 102.

$$V = \begin{vmatrix} -2 \times Diff - 1; \text{ when } Diff < 0 \\ 2 \times Diff; \text{ when } Diff \geq 0 \end{vmatrix}$$

Then, Golomb-Rice coding is performed for the integer value V based on the k parameter. An explanation will now be given for the Golomb-Rice encoding of the non-negative integer value V based on the k parameter.

First, the non-negative integer V is changed to a binary expression. Then, the binary value is divided into a lower k bit portion and an upper bit portion. Then, bits of 0, the number of which is equivalent to the count obtained when the upper bit portions are represented in the decimal system, is added to the lower k bit portions, and finally, a bit of 1 is added to obtain a coded word.

This processing will be described by using a specific example. When k=2 and V=13, binary expression "1101" of V is generated, and the lower two bits "01" are defined as Golomb-Rice coded data for the first and the second bits. Three 0s ("000") that are employed to represent the remaining upper two bits in the decimal system are defined as the Golomb-Rice coded data for the third to the fifth bits. Then, the bit of "1" is added as Golomb-Rice coded data. The finally obtained Golomb-Rice coded data is "010001".

FIG. 9 is a table showing non-negative integers and corresponding coded words when the k parameter =0, 1 and 2 to perform the above encoding processing.

The coded generated by the Golomb-Rice encoding circuit 104 is output to the terminal C' of the switch 113'.

An explanation will now be given for the run-terminal mode in which the prediction conversion circuit 105, the sign prediction conversion circuit 106 and the Golomb-Rice encoding circuit 107 perform encoding.

Figure 5:
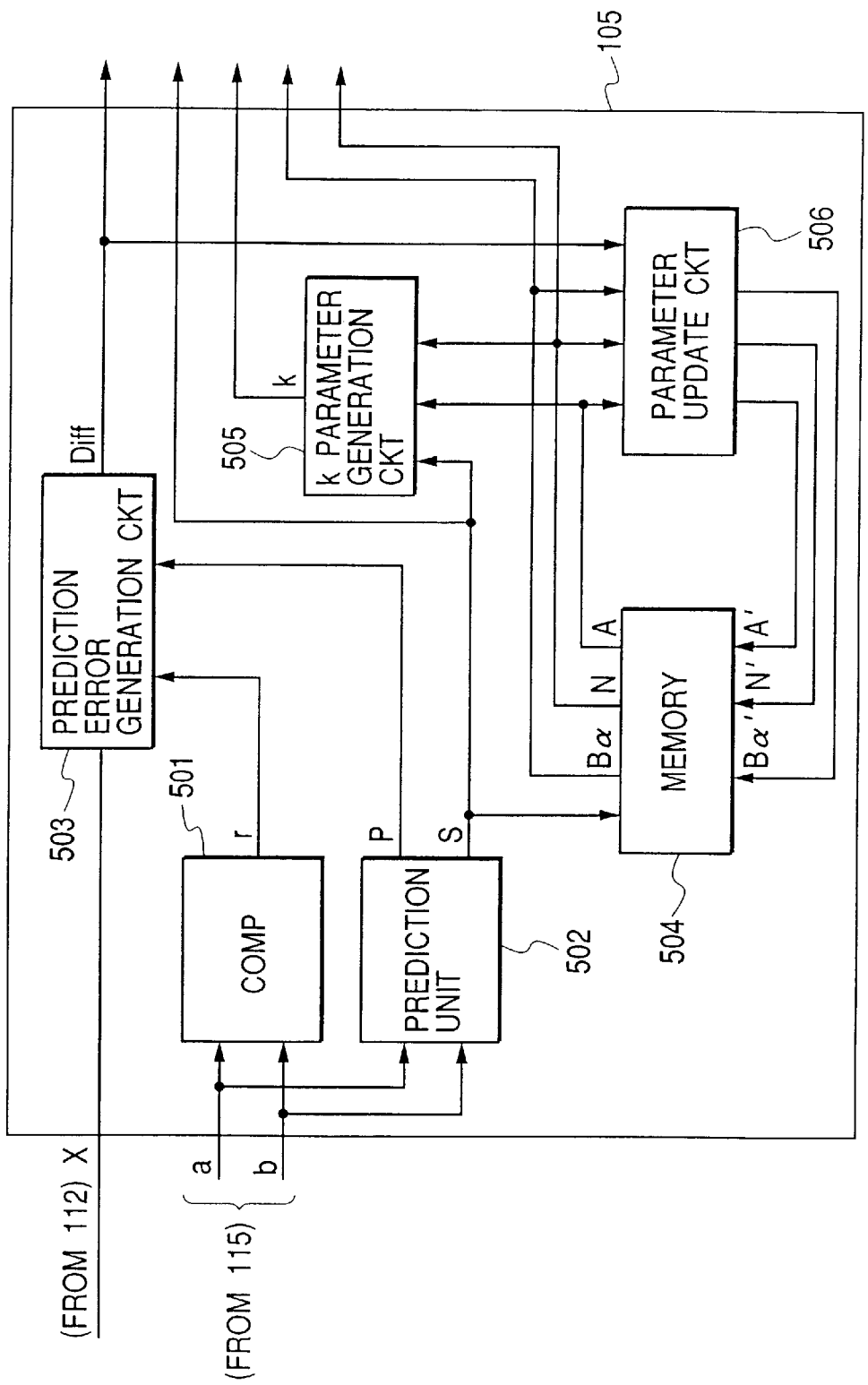
FIG. 5 is a diagram illustrating the arrangement of another prediction converting circuit.

The prediction conversion circuit 105 employs the peripheral pixel values a and b to predict a value of an object pixel, and produces a prediction difference. FIG. 5 is a diagram showing the arrangement of the predication conversion circuit 105.

In FIG. 5, the prediction conversion circuit 105 includes a comparator 501, a prediction unit 502, a prediction error generation circuit 503, a memory 504, a k parameter generation circuit 505 and a parameter update circuit 506. Further, though not shown in FIG. 1, the pixel values of the peripheral pixels a and b are transmitted from the buffer 115 to the prediction conversion circuit 105. The pixel value x of the object pixel is transmitted from the terminal B of the switch 112.

Three parameters N, A and Bα are stored in the memory 504, and correspond to the individual states specified by the status number S. At the start of the image encoding, the parameters N, A and Bα are initialized to N=1, A=4 and Bα=0. It should be noted that N denotes the number of times for generating the status S. A denotes the sum of absolute values of prediction differences in the status S, and Bα denotes the number of times where a negative prediction difference appears in the status S.

The operation by the prediction converting circuit 105 will be described in detail while referring to FIG. 5. First, the comparator 501 receives, from the buffer 115, the peripheral pixels a and b of the object pixel, and compares these values. When b>a, a value of 1 is output, while when b≦a, a value of 0 is output. The value output from the comparator 501 is hereinafter referred to as a phase flag r (1 or 0).

The prediction unit 502 employs the peripheral pixels a and b to generate a predicted value P and a status number S. when a=b, the value of the status number S is 1, while a≠b, the value is 0. The predicted value P is constantly b.

The prediction error generation circuit 503 employs the object pixel value x and the predicted value P to produce a prediction difference Diff. When the phase flag r is 0, Diff=x−P, and when the phase flag r is 1, Diff=P−x.

The k parameter generation circuit 505 reads the status S, the number of times N of generation of the status S, and the sum A of the absolute values of prediction differences in the status S, and calculates T by using the following equation.

$$T = \begin{vmatrix} A; \text{ when } S = 0 \\ A + N/2; \text{ when } S = 1. \end{vmatrix}$$

In accordance with $\min(k|N \times 2^k \geq T)$, the value of the k parameter used during Golomb-Rice encoding is obtained and output.

In consonance with the timing whereat the Golomb-Rice coding is performed for the object pixel, the parameter update circuit 506 reads, from the memory 504, the three parameters N, A and Bα in the status S, and updates them to obtain N', A' and Bα'. First, A' is obtained by calculating A'=A+|Diff|. Then, whether the difference Diff is positive or negative is examined. When the difference Diff is positive, Bα'=Bα, and when the difference Diff is negative, Bα'=Bα+1. In other words, Bα indicates the number of times whereat the prediction difference Diff is negative. N' is obtained by calculating N'=N+1.

The thus obtained N', A' and Bα' are output to the memory 504, and are written as the three parameters N, A and Bα in the status S before the Golomb-Rice encoding for the next object pixel is begun.

Through the above described processing, the prediction conversion circuit 105 outputs the prediction difference Diff, the k parameter, the status number S, and the two parameters Bα and N in the status S.

When the k parameter is 0, the sign prediction conversion circuit 106 employs the values of Bα and N to predict the sign (+/−) of the prediction difference Diff, and changes the sign of Diff based on the prediction results.

Figure 6:
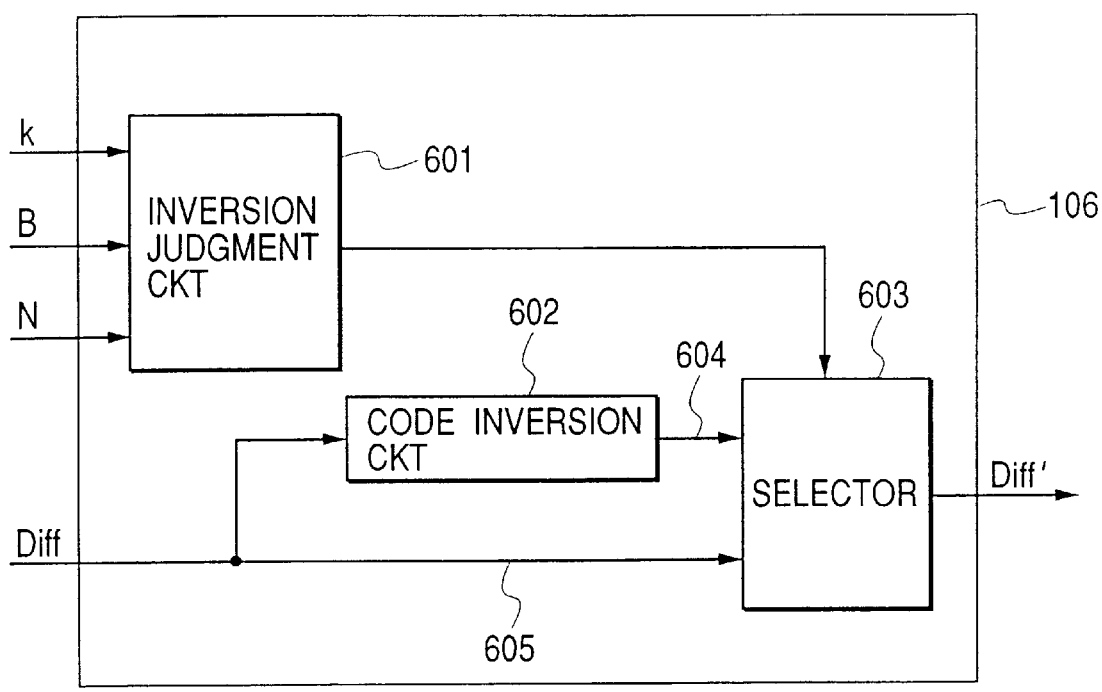
FIG. 6 is a diagram illustrating the arrangement of a code prediction converting circuit.

FIG. 6 is a diagram showing the arrangement of the sign prediction conversion circuit 106. The prediction conversion circuit 106 comprises an inversion judgement circuit 601, a sign inversion circuit 602 and a selector 603.

The operation by the sign prediction conversion circuit 106 will now be described in detail while referring to FIG. 6. First, when k=0 and Bα>N/2, the inversion judgement circuit 601 outputs a signal of "1" to instruct sign inversion. For the other cases, the circuit 601 outputs a signal of "0" to instruct no sign inversion.

Upon receipt of the instruction signal (1 or 0), the sign inversion circuit 602 inverts the sign (+/−) of the difference Diff that corresponds to the object pixel, and outputs −Diff to the signal line 604.

When the value output by the sign inversion circuit 602 is 0, the selector 603 selects the Diff received from the signal line 605, and outputs it. When the value is "1", the selector 603 outputs −Diff that is the output value of the sign inversion circuit 602.

Through this processing, the sign prediction conversion circuit 106 selects Diff or −Diff relative to the received value Diff, and outputs it.

Figure 13:
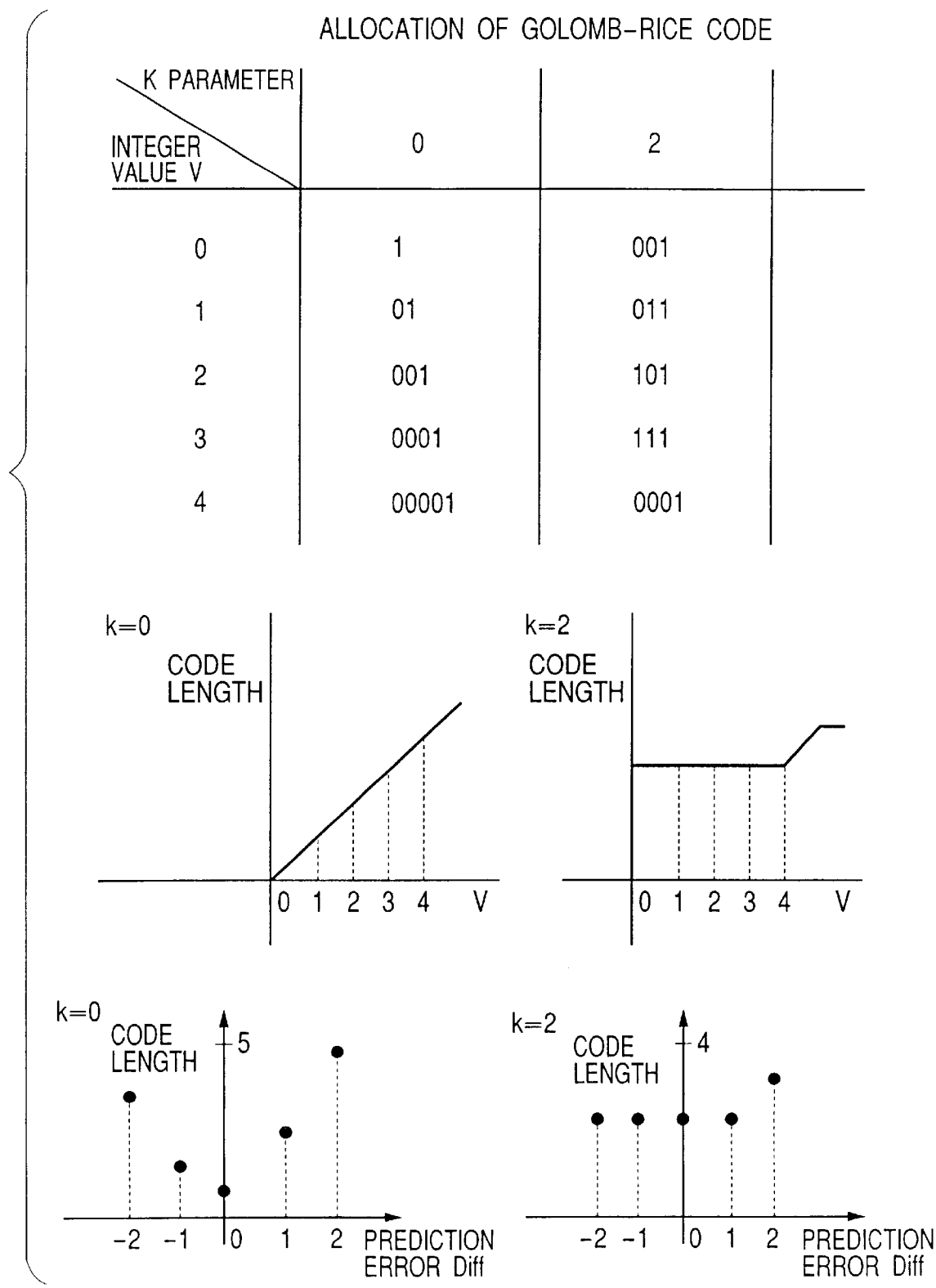
FIG. 13 is a diagram showing the assignment of Golomb-Rice code when a k parameter is 0 or 2.

The role of the sign inversion will be briefly. described.
FIG. 13 is a diagram showing the assignment of Golomb-Rice code when the k parameter is 0 and when the k parameter is 2. In FIG. 13, the case where the k parameter is 0 means a case where the values of the peripheral pixels including the object pixel are less fluctuated. Therefore, the relationship shown in FIG. 13 is established for the integer value V used in the Golomb-Rice encoding, the output code and the code length.

When the k parameter is 2, the values of the peripheral pixels including the object pixel are fluctuated more greatly than when the k parameter is 0. Thus, in order to perform appropriate encoding, the relationship shown in FIG. 13 is established between the integer value V or the prediction difference Diff during the Golomb-Rice encoding, and the output code and the code length.

When the k parameter is 0, the code length differs although the prediction differences Diff have the same absolute value. Whereas, when the k parameter is other than 0 (e.g., 2), the code length is the same when the prediction differences Diff have the same absolute value.

While taking this coding characteristic into account, sign inversion is performed only when the k parameter is 0 and when Bα>N/2 (when the number of times where the prediction difference in the status S is negative is more than half). As a result, the prediction difference Diff (e.g., −1 or 1) that has the same absolute value and that is produced more frequently can be determined as output code that has a shorter code length.

That is, when difference of −1 is frequently produced, the sign prediction converting circuit 106 does not need to perform sign inversion, and when −1 is less frequently produced (1 is more frequently produced), encoding is performed while −1 is translated as 1, so that the coding efficiency can be improved.

The above sign inversion process can be performed when the k parameter is other than 0. However, in this embodiment, the sign inversion process for such a case is not performed because it is not very effective.

The sign inversion process is changed as needed while the image data are being encoded. Since the decoding side also includes the processors that correspond to the inversion judgement circuit 601 and the sign inversion circuit 602 for the decoded peripheral pixels, the decoding side can specify an object pixel for which the interpretation as to whether the prediction difference Diff is positive or negative was changed.

When the sign inversion process has been completed, the Golomb-Rice encoding circuit 107 employs the k parameter to perform Golomb-Rice coding for a prediction difference Diff' received from the sign prediction conversion circuit 106. The Golomb-Rice encoding circuit 107 then outputs the coded data to the terminal B' of the switch 113. To do this, first, the difference Diff is changed into a non-negative integer value V by using the following equation.

$$V = \begin{vmatrix} -2 \times (Diff - S) - 1; \text{ when } Diff < 0 \\ 2 \times (Diff - S); \text{ when } Diff \neq 0 \end{vmatrix}$$

Then, the Golomb-Rice encoding is performed for the non-negative integer value V using the k parameter. The Golomb-Rice encoding processing is the same as that as explained for the Golomb-Rice encoding circuit 104.

An explanation will now be given for the run-length mode in which the run-length counter 108 and the Melcode encoding circuit 109 perform the encoding process.

The run-length counter 108 receives the object pixel value x from the Melcode encoding circuit 109, and the preceding pixel value a from the buffer 115, and outputs coding control signal c to the signal line 116, and the number RL of continuous, same luminance values to the signal line 117.

Figure 7:
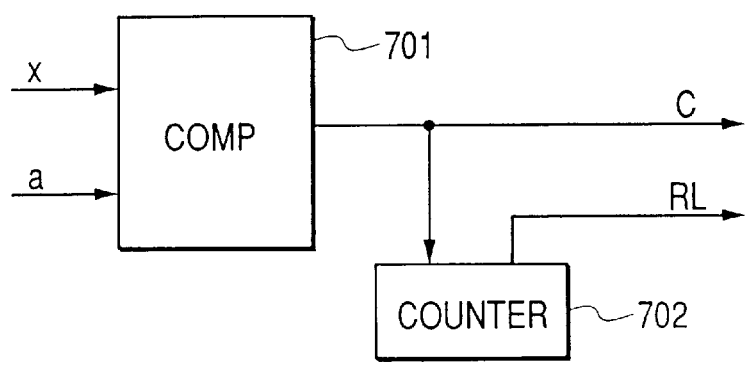
FIG. 7 is a diagram illustrating the arrangement of a run-length counter.

FIG. 7 is a diagram illustrating the arrangement of the run-length counter 108.

The run-length counter 108 comprises a comparator 701 and a counter 702. The comparator 701 compares the value of the object pixel x with the value of the preceding pixel a.

When the two values are equal, a value of "1" is output as the coding control signal c, and when the two values are not equal, a value of "0" is output. The counter 702 stores the number RL of the continuous, same luminance values. When the coding control signal of "1" is output from the comparator 701, the value RL is incremented and the resultant RL is output. When the coding control signal is "0", the value is RL is output unchanged, and is thereafter reset.

Figure 10:
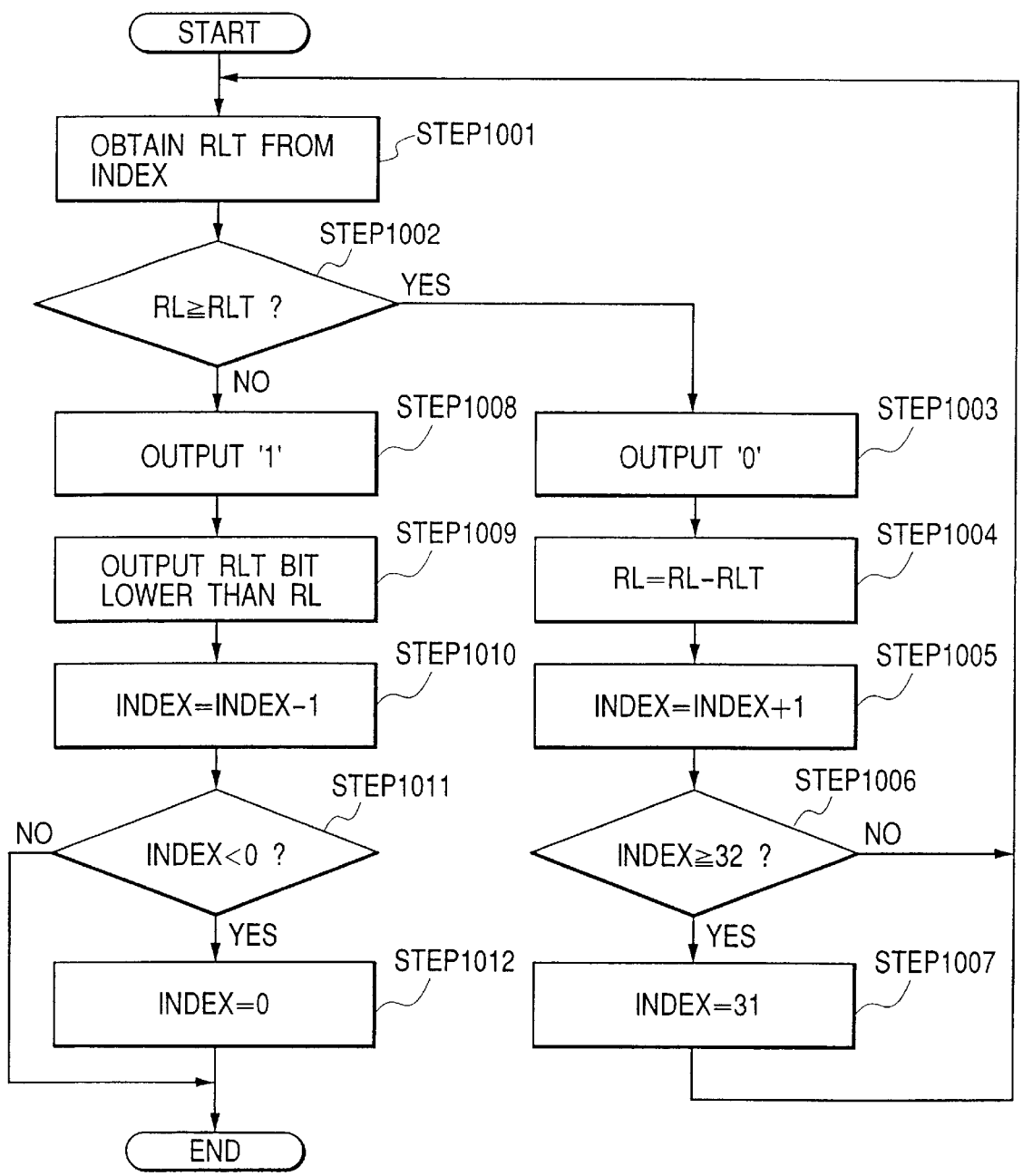
FIG. 10 is a flow chart showing the processing for Melcode coding.

Only when the coding control signal of "0" is received from the signal line 116, the Melcode encoding circuit 109 encodes the number RL of the continuous, same luminance values received from the signal line 117. FIG. 10 is a flow chart showing the Melcode encoding processing.

At STEP 1001 in FIG. 10, first, the run-length threshold value RLT is determined based on the index value (initial value at the beginning of encoding is 0) that is stored in the Melcode encoding circuit 109.

FIG. 11 is a diagram showing the index and the corresponding RLT. At STEP 1002, the value RLT is compared with the run length RL. When RL≧RLT, program control advances to STEP 1003, and when RL<RLT, program control goes to STEP 1008.

At STEP 1003, "0" is output as code, and at STEP 1004 the value RL is updated based on RL=RL−RLT. At STEP 1005, the index value is incremented, and when it is ascertained at STEP 1006 that the index value exceeds 31, at STEP 1007 a value of 31 is set for the index value, and program control thereafter returns to STEP 1001. When the index value does not exceed 31, program control returns to STEP 1001 without any process being performed.

When RL≧RLT, at STEP 1008 a value of "1" is output as code. At STEP 1009 the value RL is expressed in the binary system, and the lower RLT bit is output as code. At STEP 1010 the index value is decremented, and at STEP 1011 a check is performed to determine whether the index value is smaller than 0. When the index value is smaller than 0, at STEP 1012 a value of 0 is set to the index value, and the processing is thereafter terminated. When the index value is not smaller than 0, the processing is terminated without any processing being performed.

Through this process, the code for the run-length RL is generated and output.

The above described processing is repeated until the last pixel received from the input unit 100 is encoded. As a result, a series of code for the received image data can be output to the signal line 114.

Since the Melcode encoding method is disclosed in "THE JOURNAL OF THE INSTITUTE OF ELECTRONICS, INFORMATION AND COMMUNICATION ENGINEERS, 77/12 vol. J60-A, No. 12", no detailed explanation for it will be given.

The three encoding modes described above are employed in accordance with the encoding mode selection processing in FIG. 8.

According to the above encoding method, the lossless compression and encoding can be performed for color or monochrome multi-valued image data, without losing the amount of the data.

In this embodiment, the sign inversion process in FIG. 6 is performed for the lossless encoding. Therefore, while taking into account the characteristic of the entropy encoding, such as the Golomb-Rice coding, that the code length differs regardless of whether the prediction differences Diff have the same absolute value, whether the sign inversion is required for the prediction difference Diff before the entropy encoding can be determined depending on which of the positive sign and negative sign of the prediction difference Diff were produced more frequently before the preceding pixel of the object pixel is encoded. As a result, the prediction difference Diff that has the same absolute value and that is produced more frequency can be defined as a short code length, and efficient entropy coding can be performed.

The sign inversion process in this embodiment is characterized by being performed simply based on the number of occurrences, i.e., in accordance with which of the positive sign and the negative sign of the prediction difference Diff appeared more frequency before the preceding pixel of the object pixel is encoded. The inversion process in this embodiment is easier than the inversion method in accordance with whether the sum of the prediction differences Diff at the time where the preceding pixel m of the object pixel is encoded has a positive sign or a negative sign.

Furthermore, when a great positive or negative value is generated as the prediction difference Diff due to noise in an image, the optimal inversion process can not be preformed because the sum is biased toward either the positive or the negative side. In this embodiment, however, the affect from noise can be avoided.

Modification

The present invention is not limited to the above embodiment, and can be applied for a previous-sample prediction method to predict the value of a pixel to be encoded, or a plurality of prediction methods may be changed for use. Further, in this embodiment, the Golomb-Rice encoding and Melcode encoding are employed as the entropy encoding means; however, another entropy means may be employed as one part of these encoding means.

The sign inversion process in this embodiment is performed in the run-terminal mode. However, the present invention is not limited to this, and can be applied for the encoding process in the normal mode-for performing entropy encoding for a specific predicted value, or for an independent encoding process. These modifications can also be included in the scope of the present invention.

The present invention may be applied as one part of a system that is constituted by a plurality of apparatuses (e.g., a host computer, an interface device, a reader and a printer), or as a part of an apparatus (e.g., a copier or a facsimile machine).

Further, the present invention is not limited to the apparatuses or the methods used to implement the above embodiments, but can also include a case where software program code for implementing the previous embodiments is supplied to a computer (or a CPU or an MPU) in an apparatus or in a system, and in consonance with the program, the computer in the system or in the apparatus can operate various devices to accomplish the above embodiments.

In this case, the program code read from the storage medium performs the functions assigned to the embodiments, and the program code and the means for supplying the program code to the computer, specifically, the storage medium on which such program code is recorded, constitutes the present invention.

A storage medium for supplying such program code can be, for example, a floppy disk, a hard disk, an optical disk, a magneto-optical disk, a CD-ROM, a magnetic tape, a nonvolatile memory card or a ROM.

In addition, the present invention includes not only the case where the functions in the previous embodiments can be performed by the computer reading and executing program code, but also the case where, in accordance with an instruction in the program code, an OS (Operating System) running on the computer performs part, or all, of the actual processing.

Furthermore, the present invention includes a case where program code, read from a storage medium, is written in a memory that is mounted on a function expansion board inserted into a computer, or inserted into a function expansion unit connected to a computer, and in consonance with a program code instruction, a CPU mounted on the function expansion board, or in the function expansion unit, performs part, or all, of the actual processing in order to implement the functions included in the above described embodiments.

According to this embodiment, the k parameter that is to be used for Golomb-Rice encoding is not generated at the time where the encoding of an object pixel is begun, but regardless of the beginning of the object pixel, the k parameter is prepared and is stored in the memory immediately after the preceding pixel of the object pixel has been encoded. Therefore, fast encoding can be performed.

As is described above, according to the present invention, efficient lossless compression and encoding processing can be performed. Particularly, since the k parameter is prepared in advance regardless of the start of the encoding of an object pixel, and is stored in the memory, the Golomb-Rice encoding using the k parameter can be performed fast. As a result, the overall encoding processing speed can be increased.

The present invention can be variously modified within the scope of the following claims.

What is claimed is:

1. An encoding device, which sequentially encodes a plurality of pixels, comprising:

state determination means for determining, from a plurality of states, states of peripheral pixels of an object pixel to be encoded;

predicted value generation means for producing a predicted value of said object pixel based on said peripheral pixels;

a memory used for storing a k parameter ($k \geq 0$) for each of said plurality of states;

variable-length coding means for encoding a prediction difference between the value of said object pixel and a predicted value to variable-length code having a code length that is obtained by using said prediction difference and said k parameter that is stored in said memory and corresponds to said state determined by said state determination means; and k parameter updating means for, after variable-length encoding is performed for said object pixel, updating in advance said k parameter in order to perform variable-length encoding for another pixel that has the same state as said state determined by said state determination means, and for writing said k parameter to said memory, wherein the number of times for generation of said plurality of states, and the sum of said prediction differences generated in each of said states are stored in correlation with said states.

2. An encoding device according to claim 1, wherein said variable-length coding means performs Golomb-Rice coding based on said k parameter.

3. An encoding device according to claim 1, further comprising:

updating means for, each time one object pixel is encoded, updating either said number of times for generation or said sum that is stored in said memory.

4. An encoding device, which sequentially encodes a plurality of pixels, comprising:

state determination means for determining, from a plurality of states, states of peripheral pixels of an object pixel to be encoded;

predicted value generation means for producing a predicted value of said object pixel based on said peripheral pixels;

a memory used for storing a k parameter ($k \geq 0$) for each of said plurality of states;

variable-length coding means for encoding a prediction difference between the value of said object pixel and a predicted value to variable-length code having a code length that is obtained by using said prediction difference and said k parameter that is stored in said memory and corresponds to said state determined by said state determination means;

k parameter updating means for, after variable-length encoding is performed for said object pixel, updating in advance said k parameter in order to perform variable-length encoding for another pixel that has the same state as said state determined by said state determination means, and for writing said k parameter to said memory; and predicted value correction means for correcting said predicted value obtained by said predicted value generation means based on said sum of said prediction differences generated when the pixels before said object pixel are encoded.

5. An encoding device according to claim 1, wherein said variable-length coding means employs said k parameter updated by said k parameter updating means to perform variable-length coding for a prediction difference between said another pixel and said predicted value.

6. An encoding device, which sequentially encodes a plurality of pixels, comprising:

state determination means for determining, from a plurality of states, a state of an object pixel to be encoded;

predicted value generation means for producing a predicted value of said object pixel;

a memory used for storing a k parameter ($k \geq 0$) for each of said plurality of states;

variable-length coding means for encoding a prediction difference between the value of said object pixel and said predicted value to variable-length code having a code length that is obtained by using said prediction difference and said k parameter that is stored in said memory and corresponds to said state determined by said state determination means; and k parameter updating means for, after variable-length encoding is performed for said object pixel, updating in advance said k parameter in order to perform variable-length encoding for another pixel that has the same state as said state determined by said state determination means, and for writing said k parameter to said memory, wherein the number of times for generation of said plurality of states, and the sum of said prediction differences generated in each of said states are stored in correlation with said states.

7. An encoding device according to claim 6, wherein said variable-length coding means performs Golomb-Rice coding based on said k parameter.

8. An encoding device according to claim 6, wherein said variable-length coding means employs said k parameter updated by said k parameter updating means to perform variable-length coding for a prediction difference between said another pixel and said predicted value.

9. An encoding device, which sequentially encodes a plurality of pixels, comprising:

state determination means for determining, from a plurality of states, a state of object data to be encoded;

a memory used for storing a k parameter (k≧0) for each of said plurality of states;

variable-length coding means for encoding said object data to variable-length code having a code length that is obtained by using said object data and said k parameter that is stored in said memory and corresponds to said state determined by said state determination means; and k parameter updating means for, after variable-length encoding is performed for said object data, updating in advance said k parameter in order to perform variable-length encoding for different data that has the same state as said state determined by said state determination means, and for writing said k parameter to said memory, wherein the number of times for generation of said plurality of states, and the sum of said prediction differences generated in each of said states are stored in correlation with said states.

10. An encoding device according to claim 9, wherein said variable-length coding means performs Golomb-Rice coding based on said k parameter.

11. An encoding device according to claim 9, wherein said variable-length coding means performs variable-length coding for said different data by using said k parameter that is updated by said k parameter updating means.

12. An encoding method, which sequentially encodes a plurality of pixels, comprising the steps of:

determining, from a plurality of states, states of peripheral pixels of an object pixel to be encoded;

producing a predicted value of said object pixel based on said peripheral pixels;

storing a k parameter (k≧0) for each of said plurality of states;

encoding a prediction difference between the value of said object pixel and a predicted value to variable-length code having a code length that is obtained by using said prediction difference and said k parameter that is stored and corresponds to said state determined in said determining step; and updating in advance, after variable-length encoding is performed for said object pixel, said k parameter in order to perform variable-length encoding for another pixel that has the same state as said state determined in said determining step, and for storing said k parameter, wherein the number of times for generation of said plurality of states, and the sum of said prediction differences generated in each of said states are stored in correlation with said states.

13. An encoding method, which sequentially encodes a plurality of pixels, comprising the steps of:

determining, from a plurality of states, states of peripheral pixels of an object pixel to be encoded;

producing a predicted value of said object pixel based on said peripheral pixels;

storing a k parameter (k≧0) for each of said plurality of states;

encoding a prediction difference between the value of said object pixel and a predicted value to variable-length code having a code length that is obtained by using said prediction difference and said k parameter that is stored and corresponds to said state determined in said determining step;

updating in advance, after variable-length encoding is performed for said object pixel, said k parameter in order to perform variable-length encoding for another pixel that has the same state as said state determined in said determining step, and for storing said k parameter; and correcting said predicted value obtained in said producing step based on said sum of said prediction differences generated when the pixels before said object pixel are encoded.

14. An encoding method, which sequentially encodes a plurality of pixels, comprising the steps of:

determining, from a plurality of states, a state of an object pixel to be encoded;

producing a predicted value of said object pixel;

storing a k parameter (k≧0) for each of said plurality of states;

encoding a prediction difference between the value of said object pixel and said predicted value to variable-length code having a code length that is obtained by using said prediction difference and said k parameter that is stored and corresponds to said state determined in said determining step; and updating in advance, after variable-length encoding is performed for said object pixel, said k parameter in order to perform variable-length encoding for another pixel that has the same state as said state determined in said determining step, and for storing said k parameter, wherein the number of times for generation of said plurality of states, and the sum of said prediction differences generated in each of said states are stored in correlation with said states.

* * * * *